United States Patent
Hu et al.

(10) Patent No.: US 12,423,816 B2
(45) Date of Patent: Sep. 23, 2025

(54) METHOD AND SYSTEM FOR DETERMINING QUALITY OF CAPSULE ENDOSCOPE IMAGE

(71) Applicant: ANKON TECHNOLOGIES CO., LTD, Wuhan (CN)

(72) Inventors: Jia Hu, Wuhan (CN); Tingqi Wang, Wuhan (CN); Min Li, Wuhan (CN)

(73) Assignees: ANKON TECHNOLOGIES CO., LTD, Wuhan (CN); ANX IP HOLDING PTE. LTD., Singapore (SG)

( * ) Notice: Subject to any disclaimer, the term of this patent is extended or adjusted under 35 U.S.C. 154(b) by 387 days.

(21) Appl. No.: 18/026,097

(22) PCT Filed: Aug. 17, 2021

(86) PCT No.: PCT/CN2021/112930
§ 371 (c)(1),
(2) Date: Mar. 13, 2023

(87) PCT Pub. No.: WO2022/052752
PCT Pub. Date: Mar. 17, 2022

(65) Prior Publication Data
US 2023/0334667 A1    Oct. 19, 2023

(30) Foreign Application Priority Data
Sep. 11, 2020    (CN) .......................... 202010955720.9

(51) Int. Cl.
*G06T 7/00* (2017.01)
*G06T 7/90* (2017.01)

(52) U.S. Cl.
CPC .............. *G06T 7/0014* (2013.01); *G06T 7/90* (2017.01); *G06T 2207/10068* (2013.01); *G06T 2207/30168* (2013.01)

(58) Field of Classification Search
CPC ..................... G06T 7/0014; G06T 7/90; G06T 2207/10068; G06T 2207/30168;
(Continued)

(56) References Cited

U.S. PATENT DOCUMENTS

| 7,298,876 B1 | 11/2007 | Marshall et al. | |
| 2005/0036668 A1* | 2/2005 | McLennan | G06T 7/0012 382/128 |

(Continued)

FOREIGN PATENT DOCUMENTS

| CN | 101936706 A | | 1/2011 | |
| CN | 106408567 A | * | 2/2017 | ............. G06F 18/21 |

(Continued)

*Primary Examiner* — Emily C Terrell
*Assistant Examiner* — Julia Z. Yao
(74) *Attorney, Agent, or Firm* — Treasure IP Group, LLC

(57) ABSTRACT

A method and system for determining quality of a capsule endoscope image. The method comprises: acquiring a first group of images of a standard color card that are photographed by a capsule endoscope in a non-magnetic-field environment and a second group of images of the standard color card that are photographed by the capsule endoscope in a magnetic field environment; calculating a peak signal-to-noise ratio of each color region of the standard color card in the non-magnetic-field environment and a peak signal-to-noise ratio of each color region of the standard color card in the magnetic field environment according to the acquired first group of images and the acquired second group of images; and determining, according to the calculated peak signal-to-noise ratios, whether a magnetic field affects the quality of a capsule endoscope image. The effect of the magnetic field on the quality of an image can be effectively determined.

11 Claims, 4 Drawing Sheets

(58) Field of Classification Search
CPC ......... G06T 2207/10024; G06T 7/0002; G06T 7/0012; G06T 2207/30021
See application file for complete search history.

(56) References Cited

U.S. PATENT DOCUMENTS

2007/0282169 A1* 12/2007 Tsujita ................... A61B 1/045
600/407
2010/0032546 A1* 2/2010 Kawano ................ H04N 23/51
356/402

FOREIGN PATENT DOCUMENTS

| | | | | |
|---|---|---|---|---|
| CN | 108132274 | A | 6/2018 | |
| TW | 201310161 | A | 3/2013 | |
| TW | 464392 | B | 12/2014 | |
| TW | 201917692 | A | 5/2019 | |
| WO | 2006076444 | A1 | 7/2006 | |
| WO | WO-2020101431 | A1 * | 5/2020 | ............. G06T 15/04 |
| WO | WO-2021031458 | A1 * | 2/2021 | ............. H04N 23/88 |

\* cited by examiner

| Images | Purple | Yellow | Green | Ultramarine | Peach | Red | Blue | Orange | Amber | Azure | Magenta | Yellow-green |
|---|---|---|---|---|---|---|---|---|---|---|---|---|
| 1 and 2 | 38.55 | 44.37 | 39.73 | 40.07 | 40.48 | 37.56 | 39.06 | 40.44 | 42.53 | 41.53 | 41.74 | 42.14 |
| 1 and 3 | 37.44 | 43.94 | 40.54 | 38.83 | 41.19 | 37.32 | 39.18 | 39.47 | 41.41 | 40.66 | 42.49 | 42.33 |
| 1 and 4 | 37.75 | 43.76 | 38.73 | 39.06 | 39.88 | 36.15 | 36.09 | 36.48 | 37.23 | 37.07 | 40.18 | 41.45 |
| 1 and 5 | 37.61 | 43.49 | 39.44 | 41 | 40.27 | 35.73 | 35.98 | 36.59 | 36.86 | 37.58 | 40.57 | 41.81 |
| Mean value | 37.84 | 43.89 | 39.61 | 39.74 | 40.46 | 36.69 | 37.58 | 38.25 | 39.51 | 39.21 | 41.25 | 41.93 |

| Images | Purple | Yellow | Green | Ultramarine | Peach | Red | Blue | Orange | Amber | Azure | Magenta | Yellow-green |
|---|---|---|---|---|---|---|---|---|---|---|---|---|
| 1 and 6 | 38.83 | 43.7 | 40.12 | 38.43 | 40.28 | 35.29 | 37.77 | 41.46 | 44.63 | 41.4 | 44.03 | 43.57 |
| 1 and 7 | 38.14 | 44.44 | 40.06 | 38.48 | 39.56 | 36.09 | 37.12 | 41.95 | 44.49 | 41.72 | 43.67 | 43.23 |
| 1 and 8 | 37.73 | 44.96 | 40.72 | 38.8 | 40.16 | 36.21 | 37.31 | 42.2 | 44.31 | 41.15 | 43.72 | 42.56 |
| 1 and 9 | 36.84 | 44.28 | 40.23 | 38.04 | 40.18 | 35.87 | 37.97 | 42.47 | 44.63 | 40.78 | 43.42 | 43.32 |
| 1 and 10 | 37.76 | 43.96 | 40.96 | 38.32 | 39.99 | 36.03 | 37.09 | 41.08 | 44.95 | 40.55 | 43.11 | 42.49 |
| Mean value | 37.86 | 44.27 | 40.42 | 38.41 | 40.03 | 35.90 | 37.45 | 41.83 | 44.6 | 41.12 | 43.59 | 43.03 |

| A first group of PSNR samples | | | | | | | | | | | | Mean value |
|---|---|---|---|---|---|---|---|---|---|---|---|---|
| PSNR | 37.84 | 43.89 | 39.61 | 39.74 | 40.46 | 36.69 | 37.58 | 38.25 | 39.51 | 39.21 | 41.25 | 41.93 | 39.66 |
| A second group of PSNR samples | | | | | | | | | | | | Mean value |
| PSNR | 37.86 | 44.27 | 40.42 | 38.41 | 40.03 | 35.9 | 37.45 | 41.83 | 44.60 | 41.12 | 43.59 | 43.03 | 40.71 |

| Source of difference | Sum of squares (SS) | degree of freedom (df) | mean squares (MS) | F value | P value |
|---|---|---|---|---|---|
| Between groups | 6.56 | 1 | 6.56 | 1.06 | 0.31 |
| Within groups | 135.52 | 22 | 6.16 | | |

METHOD AND SYSTEM FOR DETERMINING QUALITY OF CAPSULE ENDOSCOPE IMAGE

CROSS-REFERENCE OF RELATED APPLICATIONS

The application is a National Phase Application of PCT International Application No. PCT/CN2021/112930, International Filing Date Aug. 17, 2021, published Mar. 17, 2022 as International Publication Number WO2022/052752A1, which claims priority from Chinese Patent Application No. 202010955720.9, filed Sep. 11, 2020, all of which are incorporated herein by reference in their entirety.

FIELD OF INVENTION

The present invention relates to the field of image information engineering, and more particularly to a method and a system for determining quality of a capsule endoscope image.

BACKGROUND

A magnetically controlled capsule endoscope system is a system which relies on a magnetic field technique to control a capsule endoscope to move in digestive tract lumen while taking images to complete an examination of the digestive tract lumen. The system includes a magnetic control device that changes the magnetic field of the digestive tract lumen where the capsule endoscope is situated when working. There is, however, no way to determine whether the magnetic field change has an effect on the quality of images captured by the capsule endoscope, and thus affecting the determination of an examination result.

SUMMARY OF THE INVENTION

The present invention provides a method and a system for determining the quality of a capsule endoscope image, which can effectively determine the impact of a magnetic field on the quality of images captured by a capsule endoscope in the digestive tract, with a reliable result. The method and system are straightforward and practical to use.

It is an object of the present invention to provide a method for determining the quality of a capsule endoscope image, comprising:
  acquiring a first group of images of a standard color card that are photographed by a capsule endoscope in a non-magnetic-field environment and a second group of images of the standard color card that are photographed by the capsule endoscope in a magnetic field environment;
  calculating a peak signal-to-noise ratio of each color region of the standard color card in the non-magnetic-field environment according to the acquired first group of images, and calculating a peak signal-to-noise ratio of each color region of the standard color card in the magnetic field environment according to the acquired second group of images by taking an image in the first group of images as a reference; and
  determining, according to the calculated peak signal-to-noise ratios, whether a magnetic field affects the quality of the capsule endoscope image.

Acquiring the first group of images of the standard color card that are photographed by the capsule endoscope in the non-magnetic-field environment and the second group of images of the standard color card that are photographed by the capsule endoscope in the magnetic field environment comprises:
  fixing the capsule endoscope and the standard color card in a dark box environment; and
  controlling the capsule endoscope to take a first preset number of images of the standard color card as the first group of images in the non-magnetic-field environment, and controlling the capsule endoscope to take a second preset number of images of the standard color card as the second group of images in a preset magnetic field environment.

The peak signal-to-noise ratio of each color region of the standard color card in the non-magnetic-field environment is a mean value of the peak signal-to-noise ratios of color regions of a plurality of images of the standard color card in the first group of images, and the peak signal-to-noise ratio of each color region of the standard color card in the magnetic field environment is a mean value of the peak signal-to-noise ratios of color regions of a plurality of images of the standard color card in the second group of images.

The first group of images comprises at least three images of the standard color card, and the peak signal-to-noise ratio of each color region of the standard color card in the non-magnetic-field environment is calculated by:
  selecting an image from the first group of images as a reference image;
  comparing each image in the first group of images except the reference image with the reference image, and calculating the peak signal-to-noise ratio of each color region of at least two images of the standard color card in the first group of images.

The second group of images comprises at least two images of the standard color card, and the peak signal-to-noise ratio of each color region of the standard color card in the magnetic field environment is calculated by:
  selecting an image from the first group of images as a reference image;
  comparing each image in the second group of images with the reference image, and calculating the peak signal-to-noise ratio of each color region of at least two images of the standard color card in the second group of images.

Determining whether the magnetic field affects the quality of the capsule endoscope image according to the calculated peak signal-to-noise ratios comprises:
  importing the peak signal-to-noise ratio of each color region of the standard color card in the non-magnetic-field environment and the peak signal-to-noise ratio of each color region of the standard color card in the magnetic field environment into a histogram;
  identifying a difference between the peak signal-to-noise ratio of each color region of the standard color card in the non-magnetic-field environment and the peak signal-to-noise ratio of each color region of the standard color card in the magnetic field environment through the histogram, to determine whether the magnetic field affects the quality of the capsule endoscope image.

determining whether the magnetic field affects the quality of the capsule endoscope image comprises:
  performing a one-way analysis of variance to the peak signal-to-noise ratio of each color region of the standard color card in the magnetic field environment and the peak signal-to-noise ratio of each color region of the standard color card in the non-magnetic-field environment; and determining whether the magnetic field affects the quality of the capsule endoscope image according to the result of the one-way analysis of variance.

It is another object of the present invention to provide a system for determining quality of a capsule endoscope image, comprising: a test fixture, an analytical instrument and a magnetic field device; where the test fixture is configured to fix a standard color card and a capsule endoscope and provide a dark box environment;

the magnetic field device is configured to provide a magnetic field environment for the capsule endoscope;

the analytical instrument is configured to acquire a plurality of images of the standard color card taken by the capsule endoscope in both a non-magnetic-field environment and the magnetic field environment, calculate a peak signal-to-noise ratio of each color region of the standard color card in the non-magnetic-field environment according to the images of the standard color card taken in the non-magnetic-field environment, and calculate a peak signal-to-noise ratio of each color region of the standard color card in the magnetic field environment according to the images of the standard color card taken in the magnetic field environment by taking one of the images of the standard color card taken in the non-magnetic-field environment as a reference, and determine whether the magnetic field affects the quality of the capsule endoscope image according to the calculated peak signal-to-noise ratios.

The test fixture comprises:

a light-tight box that is configured to provide the dark box environment; and a support that is arranged in the light-tight box and configured to fix the standard color card in a shooting direction of the capsule endoscope.

The support comprises a bottom plate, a support column and a top plate, where the top plate is fixed above the bottom plate through the support column, and the bottom plate is arranged in parallel with the top plate; the standard color card is fixed on a lower surface of the top plate downward, and the capsule endoscope is fixed on an upper surface of the bottom plate with a camera end pointing upward; and a central axis of the standard color card is coincided with a central axis of the capsule endoscope.

The analytical instrument performs a histogram analysis or a one-way analysis of variance on the calculated peak signal-to-noise ratio of each color region of the standard color card in the non-magnetic-field environment and the calculated peak signal-to-noise ratio of each color region of the standard color card in the magnetic field environment, to determine whether the magnetic field has an effect on the quality of the capsule endoscope image.

In the method and the system for determining the quality of a capsule endoscope image, according to all aspects of the present invention, the color regions of a standard color card are selected as the regions for analysis, and the peak signal-to-noise ratios of the standard color card in the non-magnetic-field environment and the magnetic field environment are analyzed, such that the effect of magnetic field on the quality of an image can be effectively determined, the determination result is reliable, and the actual application is simple and convenient.

The above description is only an overview of the technical solutions of the present invention. For a thorough understanding of the technical means of the present invention, and implementation in accordance with the detailed description, and that the above-described and other objects, features and advantages of the present invention can be more clearly understood, the detailed description of the preferred embodiments will be described in detail with reference to the accompanying drawings.

DETAILED DESCRIPTION

In order to further describe the technical means and the effect of the present invention to achieve the intended purpose of the present invention, the following embodiments, methods, steps, structures, characteristics and effects according to the present invention are described in detail in conjunction with the accompanying drawings and preferred embodiments.

The following detailed description of the preferred embodiments, taken in combination with the accompanying drawings, will reveal the foregoing and other aspects, characteristics, and effects of the present invention. The detailed description of preferred embodiments will provide a more detailed understanding of the technical means and the effect of the present invention to achieve the intended purpose. However, the accompanying drawings are only for reference and description, and are not used to limit the present invention.

Figures 1, 2, 3:
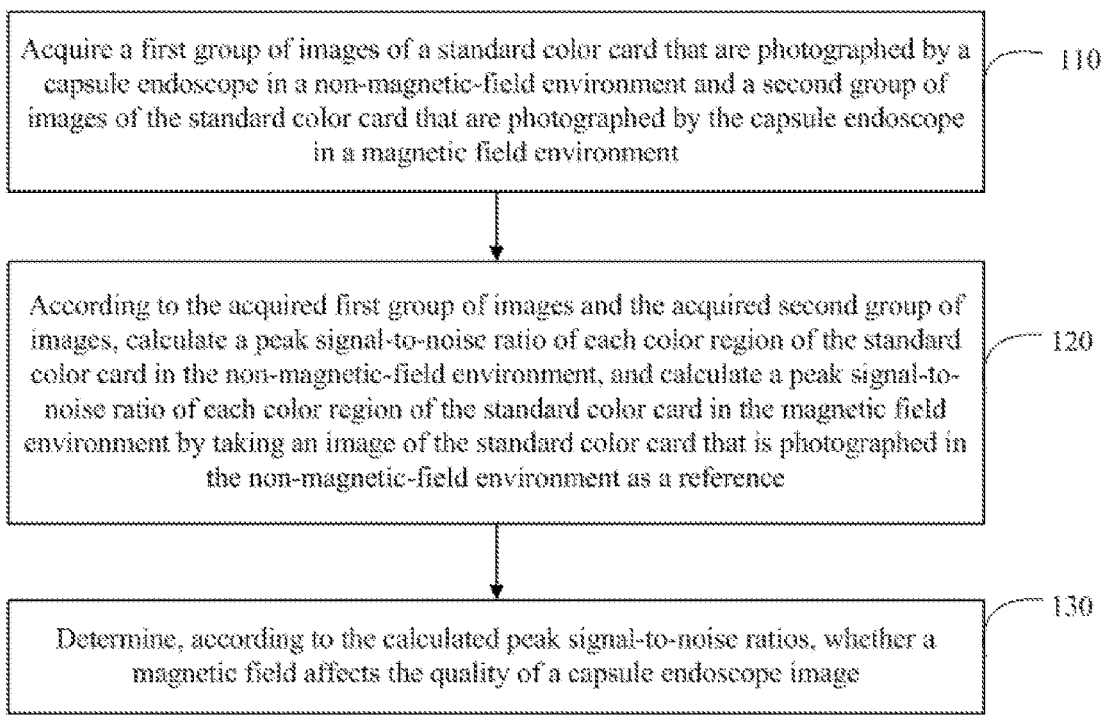
FIG. 1 is an exemplar process flow diagram of a method for determining quality of a capsule endoscope image according to an embodiment of the present invention.
FIG. 2 is a table of a correspondence between each color region and a peak signal-to-noise ratio of the standard color card images acquired in a non-magnetic-field environment by the method shown in FIG. 1.
FIG. 3 is a table of a correspondence between each color region and a peak signal-to-noise ratio of the standard color card images acquired in a magnetic field environment by the method shown in FIG. 1.

FIG. 1 is an exemplar process flow diagram of a method for determining quality of a capsule endoscope image according to an embodiment of the present invention. Referring to FIG. 1, the present invention provides a method for determining the quality of a capsule endoscope image, comprising the following steps:

Step 110, acquiring a first group of images of a standard color card that are photographed by a capsule endoscope in a non-magnetic-field environment and a second group of images of the standard color card that are photographed by the capsule endoscope in a magnetic field environment.

In an embodiment, in the step 110 of acquiring the first group of images of the standard color card that are photographed by the capsule endoscope in the non-magnetic-field environment and the second group of images of the standard color card that are photographed by the capsule endoscope in the magnetic field environment, comprises the following steps:

fixing the capsule endoscope and the standard color card in a dark box environment; and controlling the capsule endoscope to take a first preset number of images of the standard color card as the first group of images in the non-magnetic-field environment, and controlling the capsule endoscope to take a second preset number of images of the standard color card as the second group of images in a preset magnetic field environment.

In an application scenario, the capsule endoscope and the standard color card are fixed on a test support, so as to fix a distance and a shooting angle between the capsule endoscope and the standard color card, and then the test support is placed in a dark box environment (test environment). In a practical implementation, a light-tight box can be used to create the dark box environment. Alternatively, a professional black flocked cloth for photography can be used to wrap the test support to provide the dark box environment. Then, a preset number of images of the standard color card are taken in both the non-magnetic-field environment and the magnetic field environment.

When taking images in the non-magnetic-field environment, the capsule endoscope and the standard color card are fixed to the test support, the test support is placed in the dark box environment and is positioned in a geomagnetic field environment. At a maximum magnetic field strength of 0.05 mT and a maximum gradient magnetic field slew rate of 0 mT/s, the geomagnetic field environment is regarded as a non-magnetic-field environment. That is, the non-magnetic-field environment refers to an environment in which there is no external magnetic field and only the geomagnetic field acts. Then, the capsule endoscope is controlled to take the first preset number of images of the standard color card, and the images of the standard color card taken by the capsule endoscope in the non-magnetic-field environment are recorded by an analytical instrument as the first group of images.

When an image is taken in a magnetic field environment, a magnetic field device for providing the magnetic field environment is controlled to find an origin first, so as to identify the position with the maximum magnetic flux density in the magnetic field environment. In the embodiment, the magnetic field device is a magnetic field control device for the capsule endoscope. Then, the capsule endoscope and the standard color card are fixed to the test support, the test support is placed in the dark box environment and is positioned directly beneath a magnet of the magnetic field control device. At this point, the capsule endoscope is situated where the magnetic field environment has the maximum magnetic flux density. Then, the relative position between the dark box environment and the magnet is adjusted, and the magnetic field control device is controlled to provide a magnetic field environment with the maximum magnetic field strength of 150 mT and the maximum gradient magnetic field slew rate of 130 mT/s. The magnetic field environment refers to an environment in which there is an external magnetic field in addition to the effect of the geomagnetic field. Then, in the magnetic field environment, the capsule endoscope is controlled to take images of the standard color card, and the images of the standard color card taken by the capsule endoscope in the magnetic field environment are recorded by the analytical instrument as the second group of images.

Step 120, according to the acquired first group of images and the acquired second group of images, calculating a peak signal-to-noise ratio of each color region of the standard color card in the non-magnetic-field environment, and calculating a peak signal-to-noise ratio of each color region of the standard color card in the magnetic field environment by taking an image of the standard color card that is photographed in the non-magnetic-field environment as a reference.

The peak signal-to-noise ratio (PSNR) is an objective criterion for image evaluation and can be defined as the logarithm of the mean square error (MSE) between the reference image and the image to be compared relative to $(2^n-1)^2$. $(2^n-1)^2$ represents the square of the maximum value of a signal, where n is the number of bits per sample. The unit of PSNR is dB, and a higher value of PSNR means that the image to be compared has less distortion. Therefore, it is possible to quantify the impact of magnetic field on the quality of images taken by the capsule endoscope intuitively using the PSNR value.

Since a magnet inside the capsule endoscope can cause slight changes in the internal structure of the capsule endoscope when it is close to the magnet of the magnetic field device, it is difficult to ensure that there is no displacement between the images taken in the non-magnetic-field environment and the magnetic field environment in the process of measuring the impact of the magnetic field on the image quality. Therefore, the color regions of the standard color card in the images taken by the capsule endoscope are selected as analysis regions to calculate the PSNR of each color region of the standard color card. In an actual implementation, the image taken by the capsule endoscope is represented by a 8-bit sampling points, i.e. n=8. Therefore, the PSNR calculation formula is as follows:

$$PSNR = 10 \times \log_{10}\left(\frac{(2^n-1)^2}{MSE}\right) (n=8)$$

$$MSE = \frac{1}{N^2}\sum_{i,j=0}^{N-1}\left[\Delta L*(i,j)^2 + \Delta a*(i,j)^2 + \Delta b*(i,j)^2\right]$$

$$\Delta L*(i,j) = L*(i,j) - L*^{\wedge}(i,j);$$

$$\Delta a*(i,j) = a*(i,j) - a*^{\wedge}(i,j);$$

$$\Delta b*(i,j) = b*(i,j) - b*^{\wedge}(i,j).$$

Where:

N is the number of color blocks of the standard color card to be photographed;

L*(i,j) is a pixel value of the L channel of an image to be compared in a L*a*b* space;

a*(i,j) is a pixel value of the a channel of the image to be compared in the L*a*b* space;

b*(i,j) is a pixel value of the b channel of the image to be compared in the L*a*b* space;

L*^(i,j) is a pixel value of the L channel of the reference image in the L*a*b* space;

a*^(i,j) is a pixel value of the a channel of the reference image in the L*a*b* space;

b*^(i,j) is a pixel value of the b channel of the reference image in the L*a*b* space.

Specifically, to calculate the PSNR values of images taken in the non-magnetic-field environment, one image is selected from the first group of images as the reference image and the remaining images as the images to be compared. The MSE value is calculated from the pixel difference between the image to be compared and the reference image in the L*a*b*space according to the above formula to obtain the PSNR value of the image taken in the non-magnetic-field environment.

To calculate the PSNR value of an image taken in the magnetic field environment, one image is selected from the first group of images as the reference image and the second group of images are used as the images to be compared. The MSE value is calculated from the pixel difference between the image to be compared and the reference image in the L*a*b*space according to the above formula to obtain the PSNR value of the image taken in the magnetic field environment.

The step of according to the acquired first group of images and the acquired second group of images, calculating the peak signal-to-noise ratio of each color region of the standard color card in the non-magnetic-field environment and calculating the peak signal-to-noise ratio of each color region of the standard color card in the magnetic field environment by taking the image of the standard color card that is photographed in the non-magnetic-field environment as a reference comprises:

calculating the peak signal-to-noise ratio of each color region of the standard color card in the non-magnetic-field environment according to the peak signal-to-noise ratios of color regions of a plurality of images of the standard color card in the first group of images; calculating the peak signal-to-noise ratio of each color region of the standard color card in the magnetic field environment according to the peak signal-to-noise ratios of color regions of a plurality of images of the standard color card in the second group of images.

In the embodiment, the peak signal-to-noise ratio of each color region of the standard color card in the non-magnetic-field environment is a mean value of the peak signal-to-noise ratios of color regions of a plurality of images of the standard color card in the first group of images, and the peak signal-to-noise ratio of each color region of the standard color card in the magnetic field environment is a mean value of the peak signal-to-noise ratios of color regions of a plurality of images of the standard color card in the second group of images.

Specifically, after the peak signal-to-noise ratios of color regions of a plurality of images of the standard color card in the first group of images are calculated, the mean value of the peak signal-to-noise ratios of color regions of the standard color card in the non-magnetic-field environment is calculated according to the calculation results to serve as the peak signal-to-noise ratio of each color region of the standard color card in the non-magnetic-field environment. After the peak signal-to-noise ratios of color regions of a plurality of images of the standard color card in the second group of images is calculated by taking an image of the standard color card taken in the non-magnetic-field environment as a reference, the mean value of the peak signal-to-noise ratios of color regions of the standard color card in the magnetic field environment is calculated according to the calculation results to serve as the peak signal-to-noise ratio of each color region of the standard color card in the magnetic field environment.

In an embodiment, the first group of images comprises at least three images of the standard color card, and calculating the peak signal-to-noise ratio of each color region of at least two images of the standard color card in the first group of images comprises the following steps:

selecting an image from the first group of images as a reference image;

comparing each image in the first group of images except the reference image with the reference image, and calculating the peak signal-to-noise ratio of each color region of at least two images of the standard color card in the first group of images.

In addition, the second group of images comprises at least two images of the standard color card, and calculating the peak signal-to-noise ratio of each color region of at least two images of the standard color card in the second group of images comprises the following steps:

selecting an image from the first group of images as a reference image;

comparing each image in the second group of images with the reference image, and calculating the peak signal-to-noise ratio of each color region of at least two images of the standard color card in the second group of images.

In an application scenario, the standard color card may be a 12-color standard color card, and the preset number of the images of the standard color card may be 5 images taken in the non-magnetic-field environment and 5 images taken in the magnetic field environment. The first group of images are recorded to be the 1st, 2nd, 3rd, 4th and 5th images. The 1st image of the images taken in the non-magnetic-field environment is taken as a reference image, and the 2nd, 3rd, 4th and 5th images are respectively compared with the 1st image to obtain the PSNR value of each color region in the 2nd, 3rd, 4th and 5th images.

The calculated PSNR value of each color region of the standard color card in each image is shown in FIG. 2. The mean value of the peak signal-to-noise ratios of color regions can be obtained by dividing the sum of the peak signal-to-noise ratios of color regions of the images to be compared by the number of images to be compared, and the mean value is the peak signal-to-noise ratio of each color region of the standard color card in the non-magnetic-field environment. It can be seen from the data in FIG. 2 that the mean value of the peak signal-to-noise ratios of color regions of the images ranges from 36.69 dB to 43.89 dB, that is, the peak signal-to-noise ratio of each color region of the standard color card in the non-magnetic-field environment ranges from 36.69 dB to 43.89 dB.

The second group of images are recorded as the 6th, 7th, 8th, 9th and 10th images. The first image of the images taken in the non-magnetic-field environment is taken as a reference image, and the 6th, 7th, 8th, 9th and 10th images are respectively compared with the reference image to obtain the PSNR value of each color region in the 6th, 7th, 8th, 9th and 10th images. The calculated PSNR value of each color region of the standard color card in each image is shown in FIG. 3. The mean value of the peak signal-to-noise ratios of color regions can be obtained by dividing the sum of the peak signal-to-noise ratios of color regions of the images to be compared by the number of images to be compared, and the mean value is the peak signal-to-noise ratio of each color region of the standard color card in the magnetic field environment. It can be seen from the data in FIG. 3 that the mean value of the peak signal-to-noise ratios of color regions of the images ranges from 35.90 dB to 44.60 dB, that is, the peak signal-to-noise ratio of each color region of the standard color card in the magnetic field environment ranges from 35.90 dB to 44.60 dB.

In other embodiments, the peak signal-to-noise ratio of each color region of the standard color card is not a mean value of the peak signal-to-noise ratios of color regions of a plurality of images of the standard color card, but the peak signal-to-noise ratio of each color region of one image of the standard color card is selected as the peak signal-to-noise ratio of each color region of the standard color card. The selected image of the standard color card may be an image with a maximum peak signal-to-noise ratio, a minimum peak signal-to-noise ratio or an intermediate peak signal-to-noise ratio. That is, the peak signal-to-noise ratio of each color region of an image of the standard color card in the first group of images is taken as the peak signal-to-noise ratio of each color region of the standard color card in the non-magnetic-field environment, and the peak signal-to-noise ratio of each color region of an image of the standard color card in the second group of images is taken as the peak signal-to-noise ratio of each color region of the standard color card in the magnetic field environment.

Step 130, determining, according to the calculated peak signal-to-noise ratios, whether a magnetic field affects the quality of a capsule endoscope image.

In the present invention, whether the quality of the image of the standard color card taken by the capsule endoscope is affected by a magnetic field change is determined by comparing the peak signal-to-noise ratios of the image of the standard color card in the non-magnetic-field environment and the magnetic field environment.

In an embodiment, the step 130 of determining, according to the calculated peak signal-to-noise ratios, whether a magnetic field affects the quality of a capsule endoscope image comprises the following steps:

importing the peak signal-to-noise ratio of each color region of the standard color card in the non-magnetic-field environment and the peak signal-to-noise ratio of each color region of the standard color card in the magnetic field environment into a histogram;

identifying the difference between the peak signal-to-noise ratio of each color region of the standard color card in the non-magnetic-field environment and the peak signal-to-noise ratio of each color region of the standard color card in the magnetic field environment through the histogram, to determine whether the magnetic field affects the quality of the capsule endoscope image.

When the peak signal-to-noise ratio of each color region of the standard color card is the mean value of the peak signal-to-noise ratios of color regions of a plurality of images of the standard color card, the mean value of the peak signal-to-noise ratios of color regions of the standard color card in the non-magnetic-field environment is calculated according to the peak signal-to-noise ratio of each color region of the standard color card in the non-magnetic-field environment, and the mean value of the peak signal-to-noise ratios of color regions of the standard color card in the magnetic field environment is calculated according to the peak signal-to-noise ratio of each color region of the standard color card in the magnetic field environment. The difference value between the mean value of the peak signal-to-noise ratio of each color region of the standard color card in the non-magnetic-field environment and the mean value of the peak signal-to-noise ratio of each color region of the standard color card in the magnetic field environment is determined through the histogram so as to determine whether the magnetic field affects the quality of images taken by the capsule endoscope.

Figures 4, 5, 6:
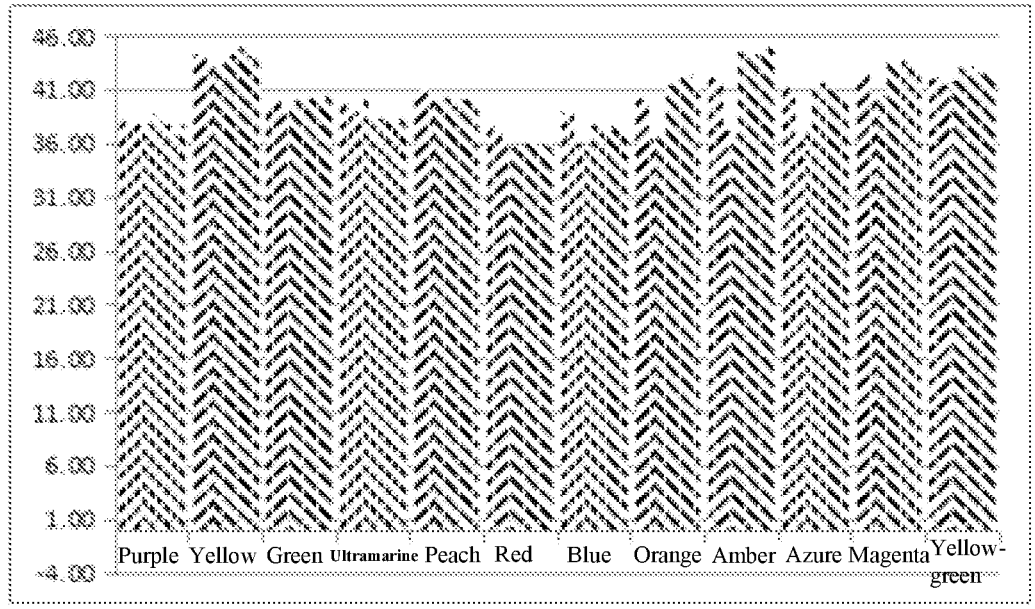
FIG. 4 is a graph of a comparison between the signal-to-noise ratios of the color regions shown in FIG. 2 and FIG. 3.
FIG. 5 is a table of a correspondence between PSNR samples for a one-way analysis of variance, according to an embodiment of the present invention.
FIG. 6 is a table of a correspondence between analysis results of the samples shown in FIG. 5.

Referring to FIG. 4, it is a contrast histogram for the peak signal-to-noise ratios of the color regions in the same color according to the mean value of the peak signal-to-noise ratios of color regions of the images of the standard color card in the non-magnetic-field environment and the magnetic field environment shown in FIG. 2 and FIG. 3. The left-diagonal histogram corresponds to the mean value of the peak signal-to-noise ratios of the 12 color regions in FIG. 2, and the right-diagonal histogram corresponds to the mean value of the peak signal-to-noise ratios of the 12 color regions in FIG. 3. It can be seen from the comparison of the two groups of data in FIG. 4 that there is little difference in the mean value of the peak signal-to-noise ratios of color regions of the two groups of data, that is, the difference value is within a specified range (difference value ≤6), indicating that the change of peak signal-to-noise ratio of each color region in the non-magnetic-field environment and the magnetic field environment is basically consistent, and it is determined that the magnetic field environment has no effect on the image quality.

In another embodiment, the step 130 of determining, according to the calculated peak signal-to-noise ratios, whether the magnetic field affects the quality of the capsule endoscope image further comprises the following steps:

performing a one-way analysis of variance to the peak signal-to-noise ratio of each color region of the standard color card in the non-magnetic-field environment and the peak signal-to-noise ratio of each color region of the standard color card in the magnetic field environment; and determining whether the magnetic field affects the quality of the capsule endoscope image according to the result of the one-way analysis of variance.

Where, one-way analysis of variance (one-way ANOVA) is used to statistically infer whether there is significant difference between the overall means represented by the means of multiple samples.

In the embodiment, the peak signal-to-noise ratio of each color region of the standard color card is the mean value of the peak signal-to-noise ratios of color regions of a plurality of images of the standard color card, and therefore, the one-way ANOVA is performed according to the mean value of the peak signal-to-noise ratios of color regions of a plurality of images of the standard color card in the non-magnetic-field environment and the magnetic field environment as shown in FIG. 2 and FIG. 3. That is, a one-way ANOVA is performed on the mean value of the peak signal-to-noise ratios of color regions of a plurality of images of the standard color card in the non-magnetic-field environment (the first group of PSNR samples) and the mean value of the peak signal-to-noise ratios of color regions of a plurality of images of the standard color card in the magnetic field environment (the second group of PSNR samples), and a F value and a P value are calculated. The F value is used to describe the difference between multiple groups of samples, and the P value is used to evaluate the significance. Each F value corresponds to a P value, and the larger the F value, the smaller the P value. Referring to FIGS. 2, 3 and 5, the first group of PSNR samples are the values corresponding to the row where the "mean value" in FIG. 2 is located. In FIG. 3, the second group of PSNR samples are the values corresponding to the row where the "mean value" in FIG. 3 is located.

If the calculated F value is close to a difference threshold, it is determined that the preset magnetic field environment has no effect on the image quality. Further, the impact of the magnetic field on the image quality can be determined by the P value. The P value is obtained correspondingly according to a significance threshold and the F value. If the P value is greater than the significance threshold, it indicates that there is no significant difference between the two groups of samples, and it is determined that the preset magnetic field environment has no effect on the image quality. On the contrary, if the P value is less than the significant threshold, it indicates that there is significant difference between the two groups of samples, and it is determined that the preset magnetic field environment has an effect on the image quality.

Referring to FIG. 5 and FIG. 6, showing an embodiment of the one-way ANOVA of the present invention. As shown in FIG. 5, two groups of samples for one-way ANOVA are listed, and the mean values of these two groups of samples are calculated respectively. Where, the first group of PSNR samples is the mean value of the peak signal-to-noise ratios of color regions of a plurality of images of the standard color card in the non-magnetic-field environment obtained by the above calculation. The second group of PSNR samples is the mean value of the peak signal-to-noise ratios of color regions of a plurality of images of the standard color card in the magnetic field environment, which is obtained by the above calculation with the image in the non-magnetic-field environment as a reference.

FIG. 6 shows the results of one-way ANOVA for the above two groups of samples. Where, sum of squares between groups refers to the sum of squares of the deviations between the mean value of each group of samples and the total mean value of samples;

- sum of squares within groups refers to the sum of squares of the deviations between the mean value of each group of samples and the sample value within the group;
- mean squares between groups are calculated by the following formula: sum of squares between groups divided by degree of freedom between groups (degree of freedom between groups is the number of sample groups minus1);
- mean squares within groups is calculated by the following formula: sum of squares within groups divided by degree of freedom within groups (degree of freedom within groups is the total number of samples minus the number of sample groups);
- F value is the ratio of the mean squares between groups and the mean squares within groups;
- P value, corresponds to the F value, and can be obtained by calculation or table lookup.

In the embodiment, the difference threshold is 1, and the significance threshold is 0.05. When the F value is closer to the difference threshold, it indicates that the difference between the two groups of samples is smaller, that is, it is determined that the preset magnetic field environment has no effect on the quality of the capsule endoscope image. Specifically, when 1<F<1.5, it is determined that the preset magnetic field environment has no effect on the quality of the capsule endoscope image. When F is not less than 1.5, it is determined that the preset magnetic field environment has an effect on the quality of the capsule endoscope image. Referring to FIG. 6, according to the results of one-way ANOVA, the F value is 1.06, close to 1, indicating that there is basically no difference between the two groups of samples, that is, it is determined that the preset magnetic field environment has no effect on the quality of the capsule endoscope image. In addition, the obtained P value=0.31>0.05, which also indicates that there is no significant difference between the two groups of samples, and it is further determined that the preset magnetic field environment has no effect on the quality of the capsule endoscope image.

In the embodiment, the color regions of the standard color card are selected as the regions for analysis, and the peak signal-to-noise ratios of the standard color card in the magnetic field environment and the non-magnetic-field environment are analyzed, such that the effect of magnetic field on the image quality can be effectively determined, the determination result is reliable, and the actual application is simple and convenient.

Figure 7:
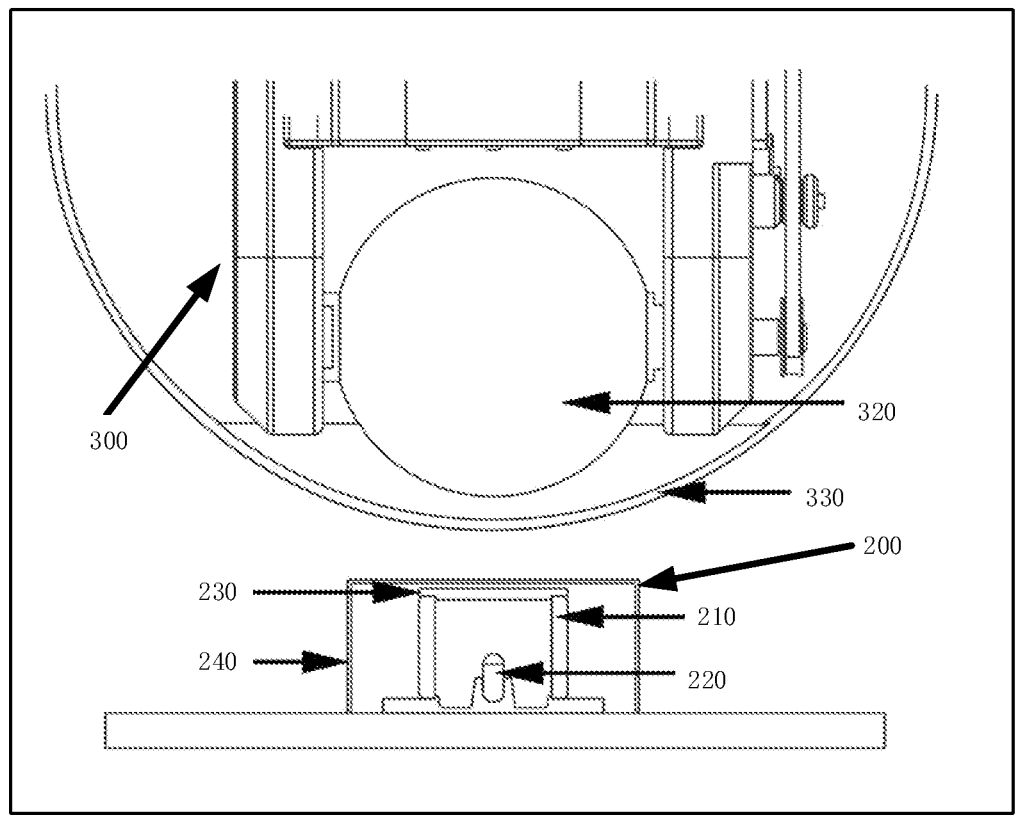
FIG. 7 is a structural diagram of a system for determining the quality of a capsule endoscope image, according to an embodiment of the present invention.
Figure 7:

FIG. 7 is a structural diagram of a system for determining the quality of a capsule endoscope image, according to an embodiment of the present invention. Referring to FIG. 7, the present invention further provides a system for determining the quality of a capsule endoscope image, comprising: a test fixture 200, an analytical instrument 400 and a magnetic field device 300.

The test fixture 200 is configured to fix the standard color card 230 and the capsule endoscope 220, and provides a dark box environment (test environment). As shown in FIG. 7, the test fixture 200 comprises a light-tight box 240 and a support 210, where the light-tight box 240 is used for providing a dark box environment. The support 210 is disposed in the light-tight box 240 for fixing the standard color card 230 in the shooting direction of the capsule endoscope 220.

In one embodiment, the test fixture 200 is specially designed for the capsule endoscope 220 and the magnetic field device 300 to ensure the stability and the best shooting distance and shooting angle between the capsule endoscope 220 and the standard color card 230, thereby improving the accuracy and reliability of the test data. The magnetic field device 300 is configured for providing a magnetic field environment. In the embodiment, the magnetic field device 300 comprises a spherical magnet 320 and a spherical shell 330 for generating a magnetic field identical to the working environment of the capsule endoscope 220. In other embodiments, the magnetic field device 300 may be designed according to actual needs, such as the shape of the magnet, or a coil may be used to provide a magnetic field environment. By controlling the magnetic field environment of the capsule endoscope 220 to be the same as the actual working magnetic field environment, the reliability of the determination result can be significantly improved.

The analytical instrument is configured to obtain a plurality of images of the standard color card 230 taken by the capsule endoscope 220 in both the non-magnetic-field environment and the magnetic field environment, calculate the peak signal-to-noise ratio of each color region of the standard color card in the non-magnetic-field environment according to the obtained images of the standard color card, and calculate the peak signal-to-noise ratio of each color region of the standard color card in the magnetic field environment by taking an image of the standard color card taken in the non-magnetic-field environment as a reference, and determining whether the magnetic field affects the quality of images of the capsule endoscope 220 according to the calculated peak signal-to-noise ratios.

In the embodiment, the analytical instrument performs a histogram analysis or a one-way ANOVA on the calculated peak signal-to-noise ratio of each color region of the standard color card in the non-magnetic-field environment and the peak signal-to-noise ratio of each color region of the standard color card in the magnetic field environment, so as to determine whether the magnetic field affects the quality of images taken by the capsule endoscope 220. The specific work flow is described in the description of the above method, which is not repeated here.

In an application scenario, the capsule endoscope 220 and the standard color card 230 are respectively fixed on the support 210, where the standard color card 230 is fixed on the top of the support 210 downward, the capsule endoscope 220 is fixed on the bottom of the support 210 with the camera facing upward, and the central axis of the standard color card 230 coincides with the central axis of the capsule endoscope 220, so as to fix the distance and the shooting angle between the capsule endoscope 220 and the standard color card 230.

Figure 8:
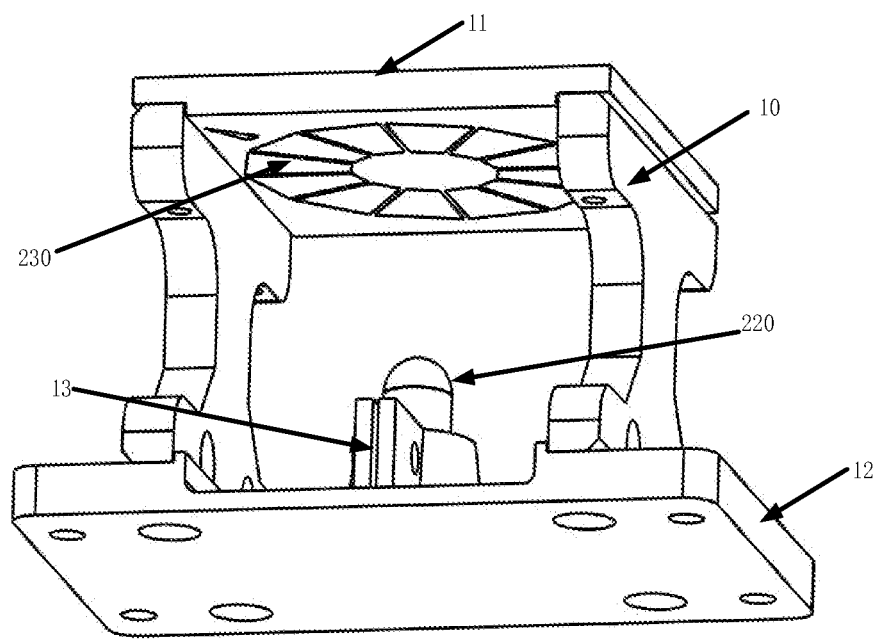
FIG. 8 is a schematic diagram of the installation structure of the capsule endoscope and the standard color card in FIG. 7.

Specifically, referring to FIG. 8, the support 210 comprises a bottom plate 12, a support column 10 and a top plate 11. The top plate 11 is fixed above the bottom plate 12 through the support column 10, and the bottom plate 12 is arranged in parallel with the top plate 11. A fixing clamp 13 for fixing the capsule endoscope 220 is disposed on a side of the bottom plate 12 facing the top plate 11, and the capsule endoscope 220 is fixed to an upper surface of the bottom plate 12 by the fixing clamp 13. The standard color card 230 is fixed to the lower surface of the top plate 11. In a practical implementation, the top plate 11 may comprise a matching plate with a hollow center and a hollow area matched with the standard color card 230 in size, and a back plate. The standard color card 230 is fixed between the matching plate and the back plate. The top plate 11 can also be a plate with a slot corresponding to the size of the standard color card 230 on the lower surface, and the standard color card 230 is fixed in the slot. The top plate 11 may also be a plate to which the standard color card 230 is adhered and fixed on the lower surface. The bottom plate 12, the top plate 11 and the support post 10 may be detachably connected, such as mortise and tenon joint, so that each component of the support 210 can be freely disassembled and replaced. For example, when the standard color card 230 used in the test needs to be replaced, the top plate 11 may be detached, and then the top plate 11 to which the standard color card is fixed may be attached.

After the standard color card 230 and the capsule endoscope 220 are mounted on the support 210, the testing fixture 220 is placed in the light-tight box 240. Thereafter, a preset number of images of the standard color card are taken in the non-magnetic-field environment and the magnetic field environment controlled by the magnetic field device 330.

When taking images in the non-magnetic-field environment, the capsule endoscope 220 and the standard color card 230 are fixed to the support 210, the support 210 is placed in the light-tight box 240 and is positioned in a geomagnetic field environment. Then, the capsule endoscope 220 is controlled to take a preset number of images of the standard color card, and the images of the standard color card taken by the capsule endoscope 220 in the non-magnetic-field environment are recorded by the analytical instrument as the first group of images.

When an image is taken in a magnetic field environment, a magnetic field device 300 for providing the magnetic field environment is controlled to find an origin first, so as to identify the position with the maximum magnetic flux density in the magnetic field environment. In the embodiment, the magnetic field device 300 is a magnetic field control device of the capsule endoscope 220. Then, the capsule endoscope 220 and the standard color card 230 are fixed to the support 210, the support 210 is placed in the light-tight box 240 and is positioned directly beneath the magnetic field device. At this point, the capsule endoscope is situated where the magnetic field environment has the maximum magnetic flux density. Then, the magnetic field control device 300 is lowered until the spherical shell 330 contacts the upper surface of the light-tight box 240. Then, the spherical magnet 320 is controlled to vertically rotate by 180°, which may be the case where the magnetic field gradient value changes the most. The magnetic field device 300 provides a magnetic field environment with a maximum magnetic flux density range of 150 mT and a maximum gradient magnetic field slew rate of 130 mT/s. Then, in the magnetic field environment, the capsule endoscope 220 is used to take images of the standard color card, and the analytical instrument is used to record the images of the standard color card taken by the capsule endoscope 220 in the magnetic field environment, that is, a second group of images for implementing the above method is obtained.

Since the internal structure of the capsule endoscope 220 may be slightly changed when a magnet inside the capsule endoscope 220 is close to the spherical magnet 320 of the magnetic field device 300, it is difficult to ensure that there is no displacement between the images taken in the non-magnetic-field environment and the images taken in the magnetic field environment in the process of evaluating the impact of the magnetic field on the image quality. Therefore, according to the embodiment of the present invention, the capsule endoscope 220 is used to photograph each color region of the standard color card 230, and calculate the peak signal-to-noise ratio of each color region of the standard color card 230 by using the analytical instrument with each color region as an analysis region. Thus, the reliability of the determination result is improved.

In the method and system for determining the quality of a capsule endoscope image, in accordance with the embodiments of the present invention, the stability and the optimal shooting distance and shooting angle between the capsule endoscope and the standard color card are ensured by using the test fixture to provide the test environment and fix the capsule endoscope and the standard color card. The magnetic field device is used to generate a magnetic field that is the same as the working environment of the capsule endoscope, ensuring that the test environment is the same as the actual use environment; the influence of magnetic field on image quality can be effectively determined by analyzing the peak signal-to-noise ratios of the standard color card in the non-magnetic-field environment and the magnetic field environment. By using the system provided by the embodiment of the invention, the accuracy of the test data can be improved, the determination result is reliable, and the practical application is simple and convenient.

The above embodiments are only illustrative of the principles and effects of the present invention, and are not intended to limit the present invention. Any person skilled in the art may make modifications or changes to the embodiments described above without departing from the spirit and scope of the present invention. Therefore, all equivalent modifications and changes made by those skilled in the art without departing from the spirit and technical concept disclosed herein shall be covered by the claims of the present invention.

The invention claimed is:

1. A method for determining quality of a capsule endoscope image, comprising:
   acquiring a first group of images of a standard color card that are photographed by a capsule endoscope in a non-magnetic-field environment and a second group of images of the standard color card that are photographed by the capsule endoscope in a magnetic field environment;
   calculating a peak signal-to-noise ratio of each color region of the standard color card in the non-magnetic-field environment according to the acquired first group of images, and calculating a peak signal-to-noise ratio of each color region of the standard color card in the magnetic field environment according to the second group of images by taking an image in the first group of images as a reference; and determining, according to the calculated peak signal-to-noise ratios, whether a magnetic field affects the quality of the capsule endoscope image.

2. The method of claim 1, wherein acquiring the first group of images of the standard color card that are photographed by the capsule endoscope in the non-magnetic-field environment and the second group of images of the standard color card that are photographed by the capsule endoscope in the magnetic field environment comprises:
  fixing the capsule endoscope and the standard color card in a dark box environment; and
  controlling the capsule endoscope to take a first preset number of images of the standard color card as the first group of images in the non-magnetic-field environment, and controlling the capsule endoscope to take a second preset number of images of the standard color card as the second group of images in a preset magnetic field environment.

3. The method of claim 1, wherein the peak signal-to-noise ratio of each color region of the standard color card in the non-magnetic-field environment is a mean value of the peak signal-to-noise ratios of color regions of a plurality of images of the standard color card in the first group of images, and the peak signal-to-noise ratio of each color region of the standard color card in the magnetic field environment is a mean value of the peak signal-to-noise ratios of color regions of a plurality of images of the standard color card in the second group of images.

4. The method of claim 3, wherein the first group of images comprises at least three images of the standard color card, and the peak signal-to-noise ratio of each color region of the standard color card in the non-magnetic-field environment is calculated by:
  selecting an image from the first group of images as a reference image;
  comparing each image in the first group of images except the reference image with the reference image, and calculating the peak signal-to-noise ratio of each color region of at least two images of the standard color card in the first group of images.

5. The method of claim 3, wherein the second group of images comprises at least two images of the standard color card, and the peak signal-to-noise ratio of each color region of the standard color card in the magnetic field environment is calculated by:
  selecting an image from the first group of images as a reference image;
  comparing each image in the second group of images with the reference image, and calculating the peak signal-to-noise ratio of each color region of at least two images of the standard color card in the second group of images.

6. The method of claim 1, wherein determining whether the magnetic field affects the quality of the capsule endoscope image according to the calculated peak signal-to-noise ratios comprises:
  importing the peak signal-to-noise ratio of each color region of the standard color card in the non-magnetic-field environment and the peak signal-to-noise ratio of each color region of the standard color card in the magnetic field environment into a histogram;
  identifying a difference between the peak signal-to-noise ratio of each color region of the standard color card in the non-magnetic-field environment and the peak signal-to-noise ratio of each color region of the standard color card in the magnetic field environment through the histogram, to determine whether the magnetic field affects the quality of the capsule endoscope image.

7. The method of claim 1, wherein determining whether the magnetic field affects the quality of the capsule endoscope image comprises:
  performing a one-way analysis of variance to the peak signal-to-noise ratio of each color region of the standard color card in the magnetic field environment and the peak signal-to-noise ratio of each color region of the standard color card in the non-magnetic-field environment; and
  determining whether the magnetic field affects the quality of the capsule endoscope image according to the result of the one-way analysis of variance.

8. A system for determining quality of a capsule endoscope image, comprising: a test fixture, an analytical instrument and a magnetic field device; wherein
  the test fixture is configured to fix a standard color card and a capsule endoscope and provide a dark box environment;
  the magnetic field device is configured to provide a magnetic field environment for the capsule endoscope;
  the analytical instrument is configured to acquire a plurality of images of the standard color card taken by the capsule endoscope in both a non-magnetic-field environment and the magnetic field environment, calculate a peak signal-to-noise ratio of each color region of the standard color card in the non-magnetic-field environment according to the images of the standard color card taken in the non-magnetic-field environment, and calculate a peak signal-to-noise ratio of each color region of the standard color card in the magnetic field environment according to the images of the standard color card taken in the magnetic field environment by taking one of the images of the standard color card taken in the non-magnetic-field environment as a reference, and determine whether the magnetic field affects the quality of the capsule endoscope image according to the calculated peak signal-to-noise ratios.

9. The system of claim 8, wherein the test fixture comprises:
  a light-tight box that is configured to provide the dark box environment; and
  a support that is arranged in the light-tight box and configured to fix the standard color card in a shooting direction of the capsule endoscope.

10. The system of claim 9, wherein the support comprises a bottom plate, a support column and a top plate, wherein the top plate is fixed above the bottom plate through the support column, and the bottom plate is arranged in parallel with the top plate; the standard color card is fixed on a lower surface of the top plate downward, and the capsule endoscope is fixed on an upper surface of the bottom plate with a camera end pointing upward; and a central axis of the standard color card is coincided with a central axis of the capsule endoscope.

11. The system of claim 8, wherein the analytical instrument performs a histogram analysis or a one-way analysis of variance on the calculated peak signal-to-noise ratio of each color region of the standard color card in the non-magnetic-field environment and the calculated peak signal-to-noise ratio of each color region of the standard color card in the magnetic field environment, to determine whether the magnetic field has an effect on the quality of the capsule endoscope image.

* * * * *